(12) United States Patent
Cisneros et al.

(10) Patent No.: US 11,078,998 B2
(45) Date of Patent: Aug. 3, 2021

(54) AMORPHOUS METAL TORQUE CONVERTOR STATOR

(71) Applicant: ZF Friedrichshafen AG, Friedrichshafen (DE)

(72) Inventors: Jorge Cisneros, Ann Arbor, MI (US); Juraj Cuperka, Windsor (CA); Troy Menebroker, Plymouth, MI (US); Enrique Cardenas Urquizo, Plymouth, MI (US); Andreas Thiede, Dittelbrunn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/712,183

(22) Filed: Dec. 12, 2019

(65) Prior Publication Data

US 2021/0180668 A1    Jun. 17, 2021

(51) Int. Cl.
| | | |
|---|---|---|
| *F16H 41/24* | (2006.01) | |
| *F16D 41/00* | (2006.01) | |
| *F16H 45/02* | (2006.01) | |

(52) U.S. Cl.
CPC ............. *F16H 41/24* (2013.01); *F16D 41/00* (2013.01); *F16H 45/02* (2013.01)

(58) Field of Classification Search
CPC .... F16H 41/24; F16H 41/30; F16H 2041/285; F16H 2041/246; F16H 45/02; F16D 41/00; F16C 2204/80; F05B 2280/6004; F05C 2253/06; F05D 2300/604
See application file for complete search history.

(56) References Cited

U.S. PATENT DOCUMENTS

| | | |
|---|---|---|
| 5,094,076 A | 3/1992 | Henricks |
| 5,431,536 A | 7/1995 | By et al. |
| 5,655,875 A | 8/1997 | Sekine |
| 5,855,263 A | 1/1999 | Fergle |
| 6,123,505 A | 9/2000 | Sasse et al. |
| 8,328,502 B2 | 12/2012 | Krusinski et al. |
| 2007/0220874 A1* | 9/2007 | Hemphill ............... F16H 41/24 60/341 |
| 2008/0173510 A1* | 7/2008 | Saka ....................... F16H 45/02 192/3.28 |

FOREIGN PATENT DOCUMENTS

| | | | |
|---|---|---|---|
| DE | 102008032460 A1 | 2/2009 | |
| WO | WO-2011161182 A1 * | 12/2011 | ............. F16C 33/44 |

* cited by examiner

*Primary Examiner* — David R Morris
*Assistant Examiner* — Lori Wu
(74) *Attorney, Agent, or Firm* — Dority & Manning, P.A.

(57) ABSTRACT

A torque convertor stator includes an annular bearing support, a plurality of stator blades, and a web extending radially between the annular bearing support and the plurality of stator blades. The annular bearing support, the plurality of stator blades, and the web are formed from a single continuous piece of amorphous metal.

19 Claims, 9 Drawing Sheets

US 11,078,998 B2

AMORPHOUS METAL TORQUE CONVERTOR STATOR

FIELD OF THE INVENTION

The present subject matter relates generally to torque converter stators.

BACKGROUND OF THE INVENTION

Torque converters generally include an impeller, a turbine and a stator. An engine coupled to the torque converter rotates the impeller to flow fluid within the torque converter from the impeller to the turbine. The flowing fluid from the impeller drives rotation of the turbine, and the turbine is coupled to an input shaft of an associated automatic transmission. Thus, the fluid within the torque converter can hydraulically connect the impeller and the turbine.

After the fluid from the impeller strikes the turbine, the fluid changes direction and recirculates back towards the impeller. Between the turbine and the impeller, the stator redirects the fluid recirculating from the turbine towards the impeller. The stator increases a turbine torque of the torque converter by changing the flow direction of the fluid.

Known stators in torque converter have drawbacks. For instance, certain known torque converter stators are formed from cast aluminum with separate thrust bearings and a one-way clutch outer race pressed into the stator casting. The cast aluminum stator is dimensioned to accommodate press-fitting the separate one-way clutch outer race to the cast aluminum stator resulting in a bulky stator. Separate thrust bearings also require cast-in features on the to cast aluminum stator retain the thrust bearings and stop the thrust bearings from rotating. Separate thrust bearings and races also require distinct sourcing considerations.

BRIEF DESCRIPTION OF THE INVENTION

Aspects and advantages of the invention will be set forth in part in the following description, or may be apparent from the description, or may be learned through practice of the invention.

In example embodiments, a torque convertor stator includes an annular bearing support, a plurality of stator blades, and a web. The web extends radially between the annular bearing support and the plurality of stator blades. The annular bearing support, the plurality of stator blades, and the web are formed from a single continuous piece of amorphous metal.

In a first example aspect, an axial thickness of the web may be no greater than about three millimeters (3 mm) and no less than a half of a millimeter (0.5 mm). In a particular example aspect, the axial thickness of the web may be no greater than about two millimeters (2 mm).

In a second example aspect, a one-way clutch may be positioned at a center opening of the annular bearing support. The annular bearing support may form an outer race of the one-way clutch.

In a third example aspect, the outer race may include a plurality of bearing slots and a plurality of flanges. Each slot of the plurality of bearing slots may be positioned circumferentially between a respective pair of flanges of the plurality of flanges.

In a fourth example aspect, a bearing cap may be mounted to the annular bearing support at the center opening of the annular bearing support.

In a fifth example aspect, the bearing cap may form a first thrust bearing surface.

In a sixth example aspect, the web may form a second thrust bearing surface that faces opposite the first thrust bearing surface of the bearing cap.

In a seventh example aspect, each of the first and second thrust bearing surfaces may define a respective plurality of radial flow channels.

In an eighth example aspect, the one-way clutch may include an inner bearing ring and a plurality of bearings. The inner bearing ring may form an inner race of the one-way clutch. The plurality of bearings may be positioned radially between and ride on the inner and outer races.

In a ninth example aspect, the torque convertor stator may be installed or used within a suitable torque converter.

Each of the example aspects recited above may be combined with one or more of the other example aspects recited above in certain embodiments. For instance, all of the nine example aspects recited above may be combined with one another in some embodiments. As another example, any combination of two, three, four, five, or more of the nine example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
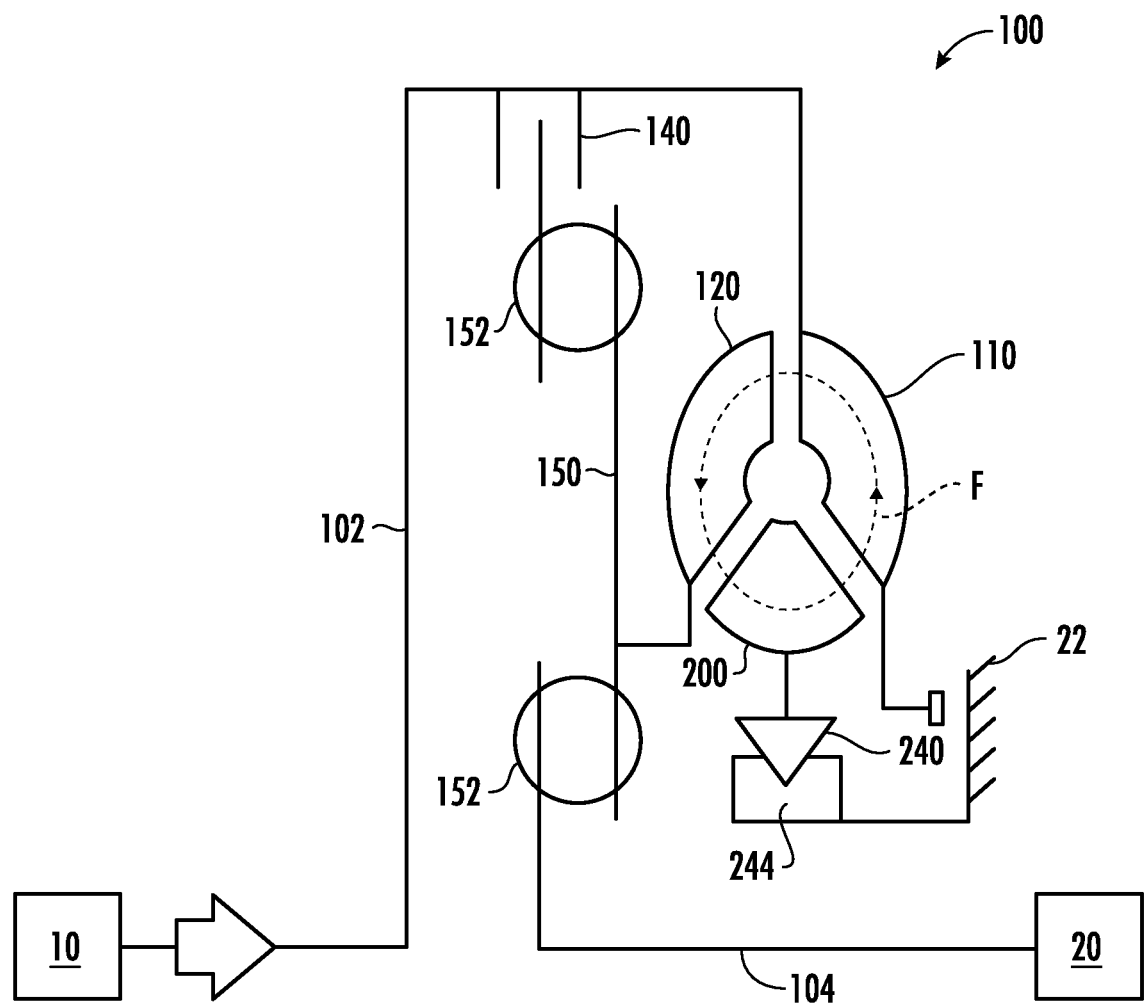
FIG. 1 is a schematic view of a torque converter according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example embodiments of the present disclosure are directed to a torque convertor stator formed from or with an amorphous metal. Utilizing amorphous metal, the torque convertor stator has numerous benefits over known torque convertor stators that are constructed with non-amorphous metal. For example, compared to known cast aluminum torque convertor stators, the torque convertor stator formed from or with amorphous metal may be significantly stronger, harder, and have tighter tolerances. In addition, the torque convertor stator formed from or with amorphous metal may have a decreased axial thickness relative to known cast aluminum torque convertor stators. Thus, a torque convertor that includes the torque convertor stator may advantageously have additional axial space for other components and/or the torque convertor may advantageously have a decreased total axial thickness. As another example, the torque convertor stator formed from or with amorphous metal may be formed with an integrated race for a one-way clutch of the torque convertor stator. Thus, construction of the torque convertor stator may advantageously require fewer parts than known cast aluminum torque convertor stators. As yet another example, a weight of the torque convertor stator formed from or with amorphous metal may be less, e.g., about twenty grams (20 g.), than the weight of known cast aluminum torque convertor stators. As a further example, one or more thrust bearings may be formed on the torque convertor stator. Thus, separate thrust bearings required in known cast aluminum torque convertor stators may be advantageously eliminated.

FIG. 1 is a schematic view of a torque converter 100 according to an example embodiment of the present subject matter. Torque converter 100 may be used in a suitable vehicle. For example, torque converter 100 may be installed in a passenger vehicle, such as a car, truck or sport utility vehicle (SUV). As may be seen in FIG. 1, torque converter 100 may be arranged in power flow between an engine 10 and an automatic transmission 20. Thus, torque converter 100 may be configured to transmit torque from engine 10 to automatic transmission 20. In particular, engine 10 may be an internal combustion engine, such as a gasoline or diesel engine, that is coupled to an input 102 of torque converter 100, that may include or correspond to a housing of torque converter 100. It will be understood that the internal combustion engine may be connected to input 102 by a flex plate or similar connection. Torque converter 100 may transmit the rotation of engine 10 to an output 104 of torque converter 100, as discussed in greater detail below.

Torque converter 100 may be used in or with any suitable automatic transmission. For example, automatic transmission 10 may be constructed or arranged in a similar manner to the automatic transmission described in U.S. Pat. No. 8,398,522 to Bauknecht et al., which is hereby incorporated by reference in its entirety for all purposes.

Torque converter 100 includes features for hydraulically coupling input 102 and output 104. For example, torque converter 100 may include a pump or impeller 110 and a turbine 120. Impeller 110 may be rotationally fixed to input 102. Thus, engine 10 may rotate impeller 110 by rotating input 102. Conversely, turbine 120 may be rotationally fixed to output 104. Thus, rotation of turbine 120 may also rotate output 104.

An interior of torque converter 100 may be at least partially filled with a fluid F that is flowable between impeller 110 and turbine 120. In particular, engine 10 may drive rotation of impeller 110 such that impeller 110 urges the fluid F against turbine 120. As the fluid F from impeller 110 impacts turbine 120 within torque converter 100, the fluid F drives rotation of turbine 120. Because turbine 120 is coupled to output 104, output 104 may rotate due to the fluid F from impeller 110 impacting turbine 120.

As may be seen from the above, the fluid F within torque converter 100 may hydraulically couple input 102 and output 104. Such hydraulic coupling may allow power transfer from engine 10 to automatic transmission 20 via torque converter 100 while also allowing relative rotation between impeller 110 and turbine 120 and between input 102 and output 104. Thus, e.g., when an associated vehicle is stopped or operating at low speeds, the fluid F within torque converter 100 may hydraulically couple input 102 and output 104 to provide power transfer from engine 10 to automatic transmission 20 while also allowing relative rotation between input 102 and output 104 to avoid stalling engine 10.

Torque converter 100 may further include a stator 200. Stator 200 may be arranged between turbine 120 and impeller 110. For example, as noted above, the fluid F within torque converter 100 may be driven from impeller 110 against turbine 120 in order to rotate output 104. After impacting turbine 120, the fluid F returns to impeller 110 within torque converter 100. Stator 200 deflects the fluid F returning to impeller 110 from turbine 120. By changing the direction of the fluid F between turbine 120 and impeller 110, stator 200 may increase a torque of turbine 120. As may be seen from the above, the fluid F within torque converter 100 may form a recirculating flow path from impeller 110 to turbine 120, from turbine 120 to stator 200, and from stator 200 back to impeller 110.

Torque converter 100 also includes features for mechanically coupling input 102 and output 104. For example, torque converter 100 may include a lock-up clutch 140. Lock-up clutch 140 is operable to selectively couple input 102 to output 104. When lock-up clutch 140 is open, lock-up clutch 140 may not connect input 102 to output 104 or may only provide negligible torque transfer between input 102 and output 104, e.g., due to fluid sheering between plates of lock-up clutch 140. As may be seen from the above, the fluid F within torque converter 100 may hydraulically couple input 102 and output 104 when lock-up clutch 140 is open. Conversely, lock-up clutch 140 may connect or couple input 102 to output 104 when lock-up clutch 140 is closed. Thus, e.g., input 102 may be directly coupled and/or rotationally fixed to output 104 via lock-up clutch 140 when lock-up clutch 140 is closed.

As may be seen from the above, lock-up clutch 140 may mechanically couple input 102 and output 104 when lock-up clutch 140 is closed, and the hydraulic coupling provided by the fluid F may be bypassed. Such mechanical coupling may allow power transfer from engine 10 to automatic transmission 20 without relative rotation between input 102 and output 104 or with negligible relative rotation between input 102 and output 104, e.g., due to slipping between the plates of lock-up clutch 140. Thus, e.g., when an associated vehicle is operating at high speeds, lock-up clutch 140 may close for mechanical coupling between input 102 and output 104 and to provide more efficient power transfer from engine 10 to automatic transmission 20.

Torque converter 100 may also include a torsion damper 150. Torsion damper 150 is disposed in the, e.g., hydraulic and/or mechanical, power flow between input 102 and output 104. Torsion damper 150 is configured to attenuate rotary oscillations of engine 10 from being transferred into automatic transmission 20 through torque converter 100. Torque converter 100 may include one or more series of coil springs, one or more sets of moving masses, and combinations thereof (indicated generally with 152) that temporarily store energy occurring in rotational irregularities of engine 10 and then guide such energy into automatic transmission 20 with a smoother speed characteristic and/or torque characteristic. As an example, torsion damper 150 may include turbine torsional vibration dampers, two-damper converters, mass pendulums, etc. Thus, torsion damper 150 may assist with attenuating engine rotary oscillations to improve shift quality in automatic transmission 20 and/or improve acoustic properties relative to torque converters without torsion dampers.

Torque converter 100 may further include a freewheel or one-way clutch 240. One-way clutch 240 may be configured to allow stator 200 to rotate in a first rotational direction, e.g., that corresponds to the rotational direction of engine 10 and input 102, and may block rotation of stator 200 in a second, opposite rotational direction. For example, during operation of torque converter 100, a rotation speed of output 104 may increase and approach a rotation speed of input 102. In such conditions, stator 200 may rotate freely in the first rotational direction in the current of the fluid F on one-way clutch 240. Thus, torque converter 100 may act as a "pure" fluid clutch without torque multiplication from stator 200. An inner race 244 of one-way clutch 240 may be fixed to a housing 22, e.g., of automatic transmission 20.

Figure 2:
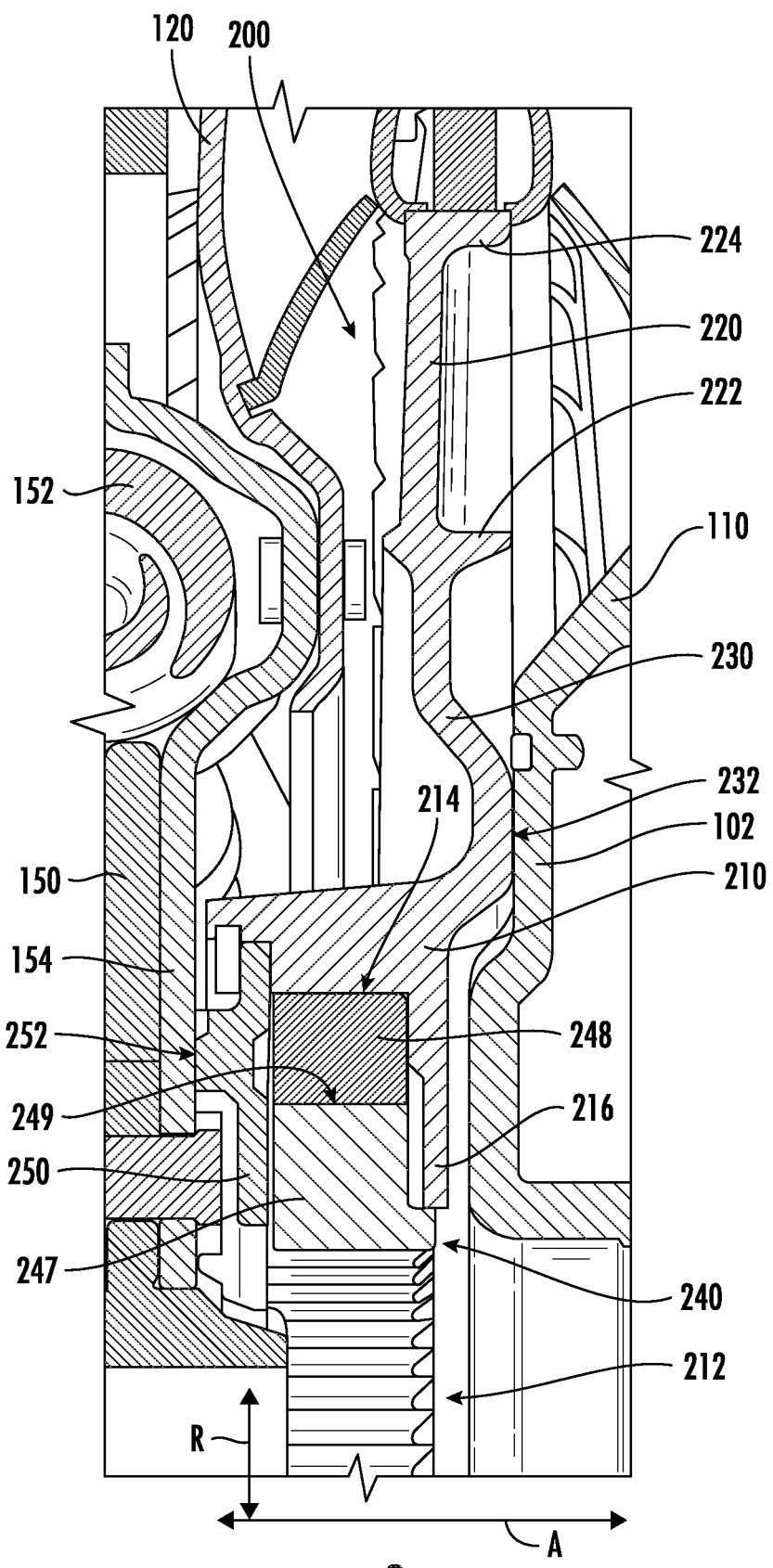
FIG. 2 is a partial, section view of certain components of the example torque converter of FIG. 1.
Figure 3:
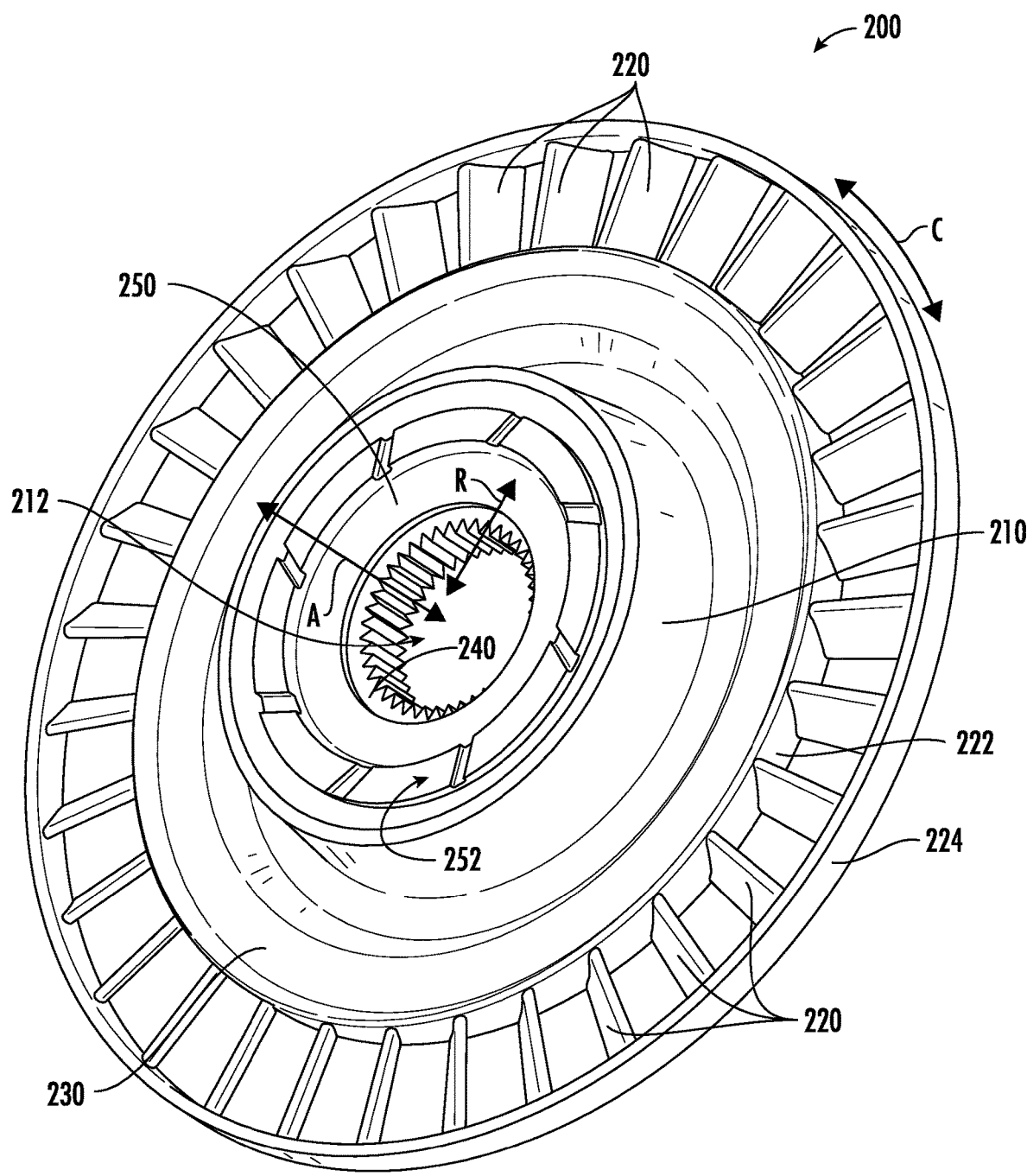
FIG. 3 is a front, perspective view of a stator of the example torque converter of FIG. 1.
Figure 4:
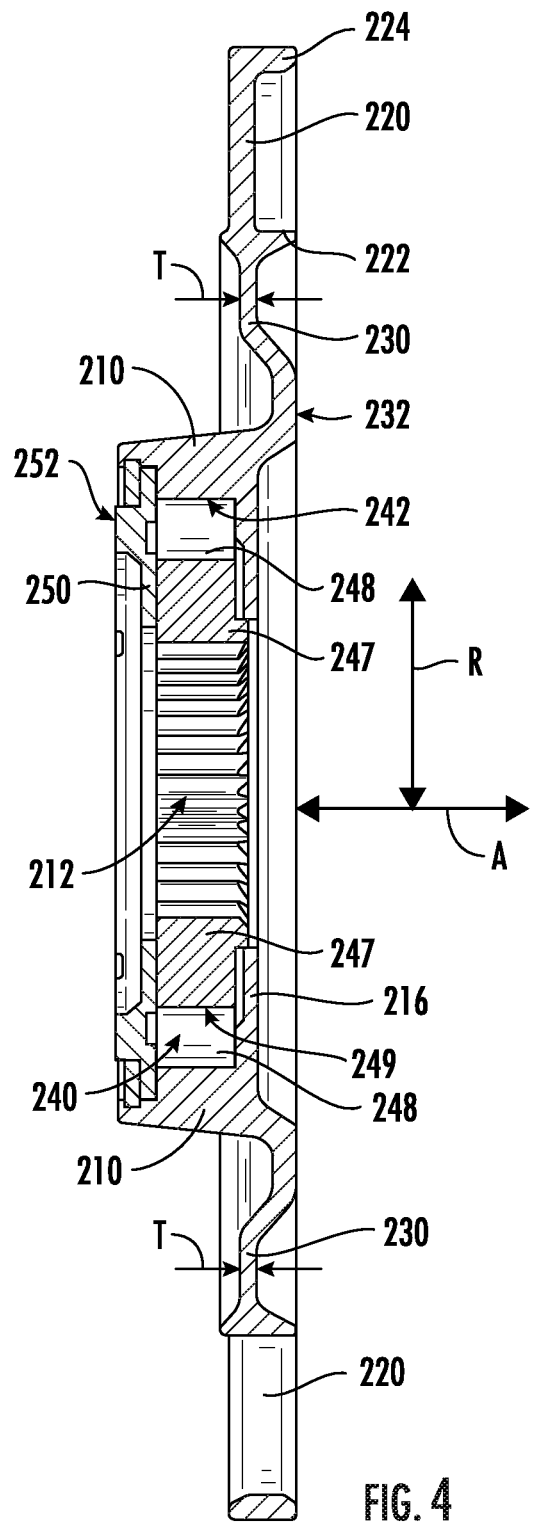
FIG. 4 is a side, section view of the stator of FIG. 3.
Figure 5:
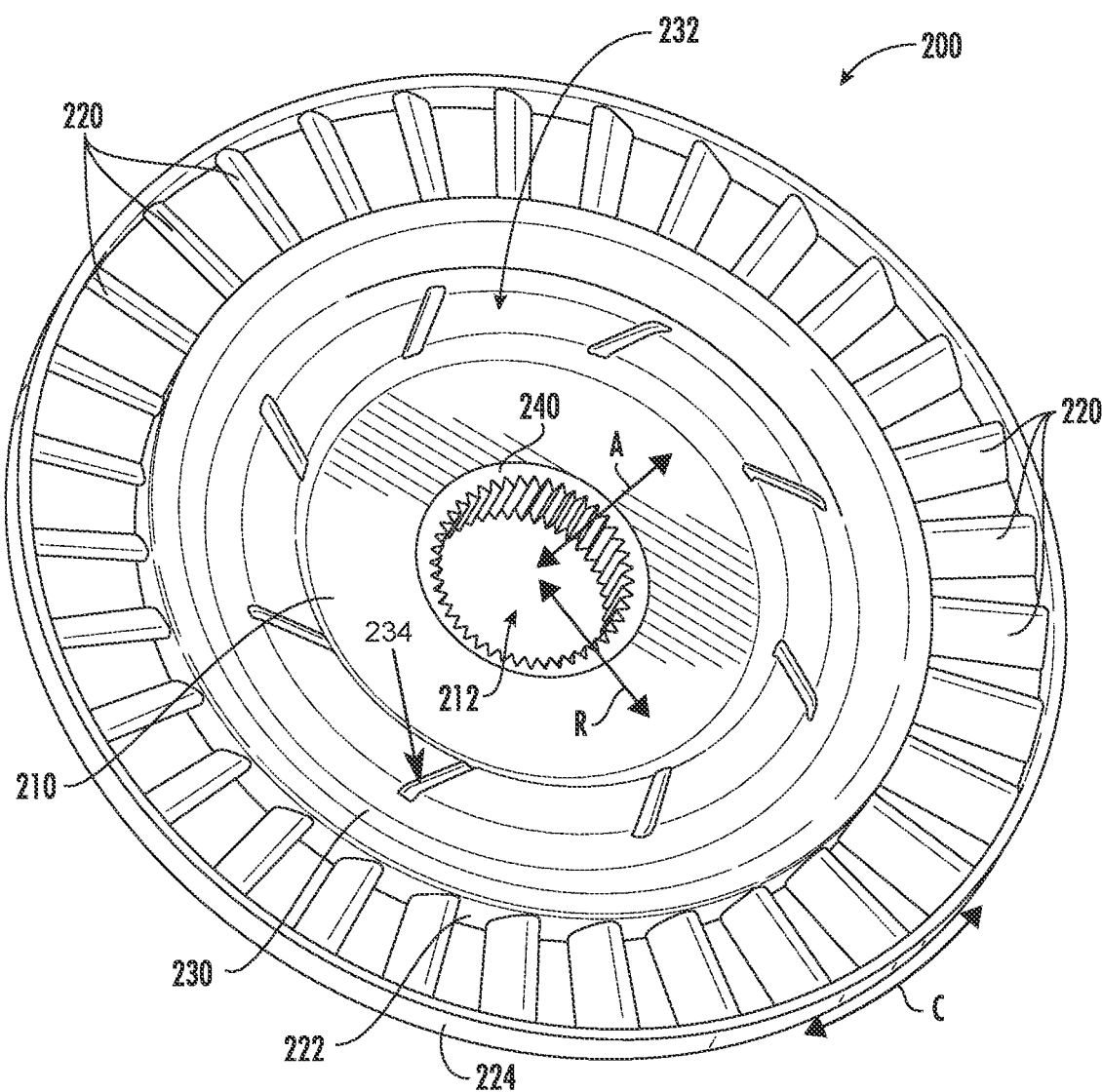
FIG. 5 is a rear, perspective view of the stator of FIG. 3.

FIG. 2 is a partial, section view of certain components of torque converter 100 including stator 200. FIG. 3 is a front, perspective view of stator 200. FIG. 4 is a side, section view of stator 200. FIG. 5 is a rear, perspective view of stator 200. As discussed in greater detail below, stator 200 has various benefits over known torque converter stators. For example, stator 200 may be significantly stronger, harder, thinner, and have tighter tolerances and/or fewer components than known torque converter stators. Stator 200 may define an axial direction A, a radial direction R, and a circumferential direction C.

As shown in FIGS. 2 through 5, stator 200 may include an annular bearing support 210. Annular bearing support 210 may support various components of stator 200, including one-way clutch 240. For example, annular bearing support 210 may define a center opening 212. One-way clutch 240 may be disposed at center opening 212 of annular bearing support 210. Annular bearing support 210 may have a generally circular cross-section shape, e.g., in a plane that is perpendicular to the axial direction A. However, various features of one-way clutch 240 may be formed on an inner surface 214 of annular bearing support 210, e.g., that faces center opening 212. Thus, e.g., it will be understood that the cross-sectional shape of annular bearing support 210 need not be perfectly circular in various example embodiments.

A bearing cap 250 may be mounted to annular bearing support 210 at center opening 212. Bearing cap 250 may assist with mounting one-way clutch 240 to annular bearing support 210. For example, one-way clutch 240 may be positioned between bearing cap 250 and a flange 216 of annular bearing support 210, e.g., along the axial direction A. Flange 216 may extend inwardly along the radial direction R from annular bearing support 210, and flange 216 may be positioned opposite bearing cap 250 about one-way clutch 240, e.g., along the axial direction A. Various components of one-way clutch 240, e.g., an inner bearing ring 247, rollers/bearings 248, etc., may be held between flange 216 and bearing cap 250 on annular bearing support 210. Flange 216 may also be positioned at a side of annular bearing support 210 that is adjacent to a side of web 230 that forms a second thrust bearing surface 232, which is described in greater detail below.

Stator 200 may also include a plurality of stator blades 220. Stator blades 220 may be shaped to deflect and reorient the fluid F returning to impeller 110 from turbine 120, as noted above. Stator blades 220 may extend along the radial direction R, e.g., from an inner ring support 222 to an outer ring support 224. Stator blades 220 may also be distributed, e.g., uniformly, along the circumferential direction C. Stator blades 220 may include no less than ten (10) stator blades, no less than twenty (20) stator blades, etc. in various example embodiments.

Stator 200 may further include a web 230. Web 230 may extend, e.g., along the radial direction R, between annular bearing support 210 and stator blades 220. Thus, web 230 may connect or couple annular bearing support 210 and stator blades 220. In particular, web 230 may connect or couple annular bearing support 210 and stator blades 220 such that stator blades 220 are rotationally fixed relative to annular bearing support 210.

Various components of stator 200 may formed from or with amorphous metal or metallic glass. Amorphous metal may be a solid metallic material with disordered atomic-scale structure. For instance, the atomic-scale structure may be non-crystalline. In certain example embodiments, the amorphous metal may include various alloys that include zirconium, copper, nickel, and other metals. For example, the amorphous metal may be one or more of: an alloy of zirconium, copper, nickel, titanium, and beryllium; an alloy of zirconium, copper, nickel, aluminum, and titanium; an alloy of zirconium, copper, nickel, and aluminum; and an alloy of zirconium, copper, nickel, aluminum, and niobium. Alternatively, the amorphous metal may be a steel alloy or a magnesium alloy. The amorphous metal may be melted and injection molded to form stator 200. By injection molding components of stator 200 with amorphous metal, high volumes of stator 200 may be advantageously manufactured cost effectively. Stator 200 may be formed by an additive manufacturing process or other suitable manufacturing method in alternative example embodiments.

As noted above, various components of stator 200 may formed from or with amorphous metal. In particular, annular bearing support 210, stator blades 220, and web 230 may be formed from a single continuous piece of amorphous metal. Thus, e.g., annular bearing support 210, stator blades 220, and web 230 may be formed in a single step amorphous metal injection molding process. After injection molding annular bearing support 210, stator blades 220, and web 230 from amorphous metal, post-processing, e.g., machining, of such components may also be advantageously eliminated or reduced relative to known cast aluminum torque convertor stators. For instance, the single continuous piece of amorphous metal that forms support 210, stator blades 220, and web 230 may require no additional post-processing, e.g., other than removing gates and runners.

By forming stator 200 from amorphous metal, stator 200 may be significantly stronger, harder, and have tighter tolerances than known cast aluminum torque converter stators.

For example, known cast aluminum torque converter stators have a tolerance no less than two tenths of a millimeter (±0.2 mm), and an injection molded amorphous metal stator may have a tolerance of no less than two hundredths of a millimeter (±0.02 mm). Due to tolerance increases, a size of stator 200 may be reduced relative to known torque convertor stators that utilize traditional fabrication techniques. As another example, by forming stator 200 from amorphous metal, stator blades 220 have a critical dimension tolerance of one percent (1%), a significant improvement over the critical dimension tolerance of ten percent (10%) provided by traditional fabrication techniques. The critical dimension of the stator blades 220 may correspond to a spacing between adjacent stator blades 220, a length of stator blades 220 between leading and trailing edges of stator blades 220, etc.

In addition, as shown in FIG. 4, a thickness T of web 230, e.g., along the axial direction A, may be less than the thickness of known injection molded stators. For example, the thickness T of web 230 may be no greater than about three millimeters (3 mm) and no less than a half of a millimeter (0.5 mm). As another example, the thickness T of web 230 may be about two millimeters (2 mm). As used herein, the term "about" means within a quarter of a millimeter (0.25 mm) of the stated width when used in the context of widths. Such recited thicknesses T are significantly less than the thicknesses in known cast aluminum torque convertor stators. The space and/or weight savings provides by such reduced axial thicknesses may advantageously be occupied by other torque converter components, transmission components, etc.

The thickness T of web 230 may vary along the radial direction R. For example, the thickness T of web 230 may taper from adjacent annular bearing support 210 to adjacent stator blades 220. Alternatively, the thickness T of web 230 may be constant along the radial direction R.

Figure 6:
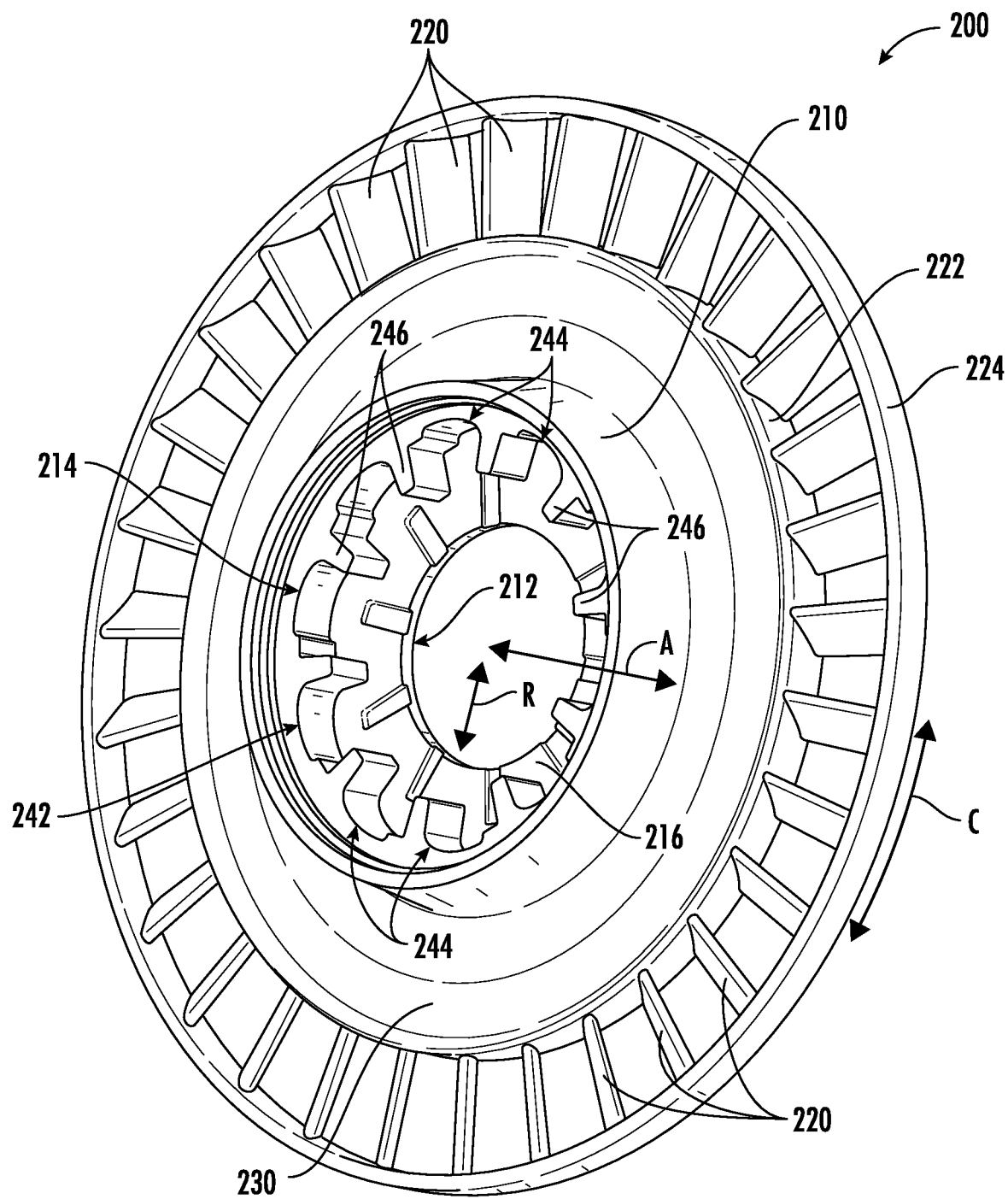
FIG. 6 is another front, perspective view of the stator of FIG. 3 with a bearing cap of the stator removed.

FIG. 6 is another front, perspective view of stator 200 with bearing cap 250 of stator 200 removed. As shown in FIG. 6, annular bearing support 210 may form an outer race 242 of one-way clutch 240, e.g., at inner surface 214 of annular bearing support 210. Thus, at least a portion of one-way clutch 240 may be formed with or integrated into annular bearing support 210. In certain example embodiments, outer race 242 may be a cylindrical surface. Alternatively, as shown in FIG. 6, outer race 242 may include a plurality of bearing slots 244 and a plurality of walls or flanges 246.

Each slot 244 may be positioned between a respective pair of flanges 246, e.g., along the circumferential direction C. A bearing 248, such as a cylindrical steel bearing or roller, may be disposed within each respective bearing slot 244. Slots 244 may be shaped to engage bearings 248 and provide the one-way functionality of one-way clutch 240 described above.

Flanges 246 may contain or hold bearings 248 within slots 244. Flanges 246 may extend inwardly, e.g., along the radial direction R, from annular bearing support 210 towards center opening 212. Flanges 246 may be formed of or with the single continuous piece of amorphous metal that forms annular bearing support 210, stator blades 220, and web 230. In certain example embodiments, bearing slots 244 may include no less than five (5) bearing slots, and flanges 246 may include no less than five (5) flanges.

By forming outer race 242 of one-way clutch 240 with annular bearing support 210, a total number of components for stator 200 may be advantageously reduced. For example, known cast aluminum torque convertor stators require separate, e.g., steel, outer races that are separately manufactured and press-fit on the cast aluminum torque convertor stators. Thus, the separate manufacturing process and associated tolerance stack for outer races may be advantageously eliminated by forming outer race 242 of one-way clutch 240 with annular bearing support 210. In addition, in known cast aluminum torque convertor stators, significant forces are applied to the cast aluminum torque convertor stators in order to mount the separate outer races. To account for such forces, the webs in known cast aluminum torque convertor stators have a significant axial thickness. Because a separate outer race is not press-fit to the annular bearing support, the thicknesses T of web 230 may be advantageously reduced compared to known cast aluminum torque convertor stators.

Turning back to FIGS. 2 and 4, one-way clutch 240 may also include an inner bearing ring 247 and bearings 248, such as cylindrical or ball bearings. Inner bearing ring 247 may form an inner race 249 of one-way clutch 240. Bearings 248 may be positioned between inner and outer races 242, 249 and may ride on inner and outer races 242, 249. Inner race 249 may complement outer race 242. For example, inner race 249 may be cylindrical. In alternative example embodiments, inner race 249 may include bearing pockets and flanges as discussed above for outer race 242. Inner bearing ring 247 may, e.g., be formed of steel or another suitable metal.

Figure 7:
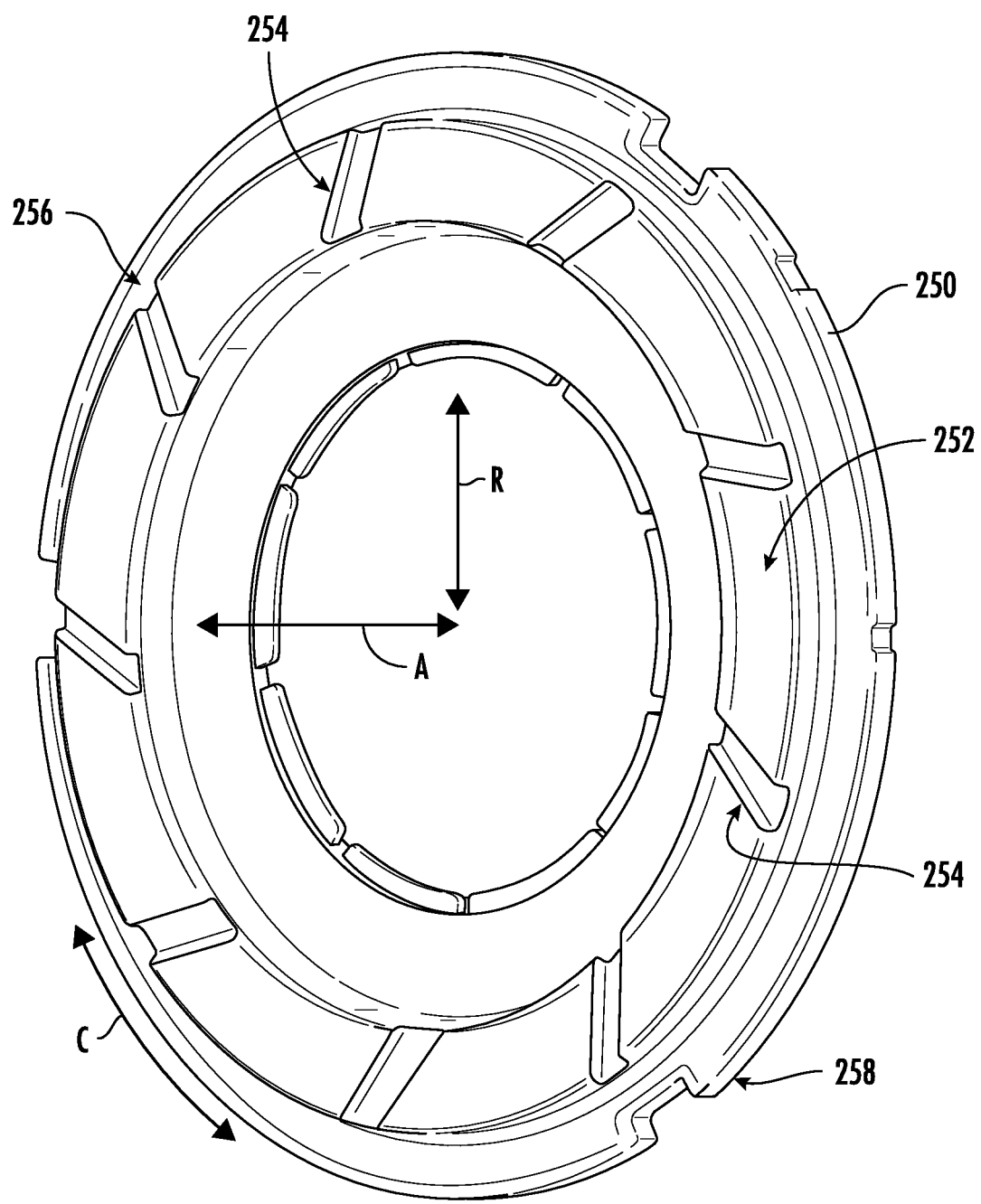
FIG. 7 is a front, perspective view of the bearing cap of the stator of FIG. 3.
Figure 8:
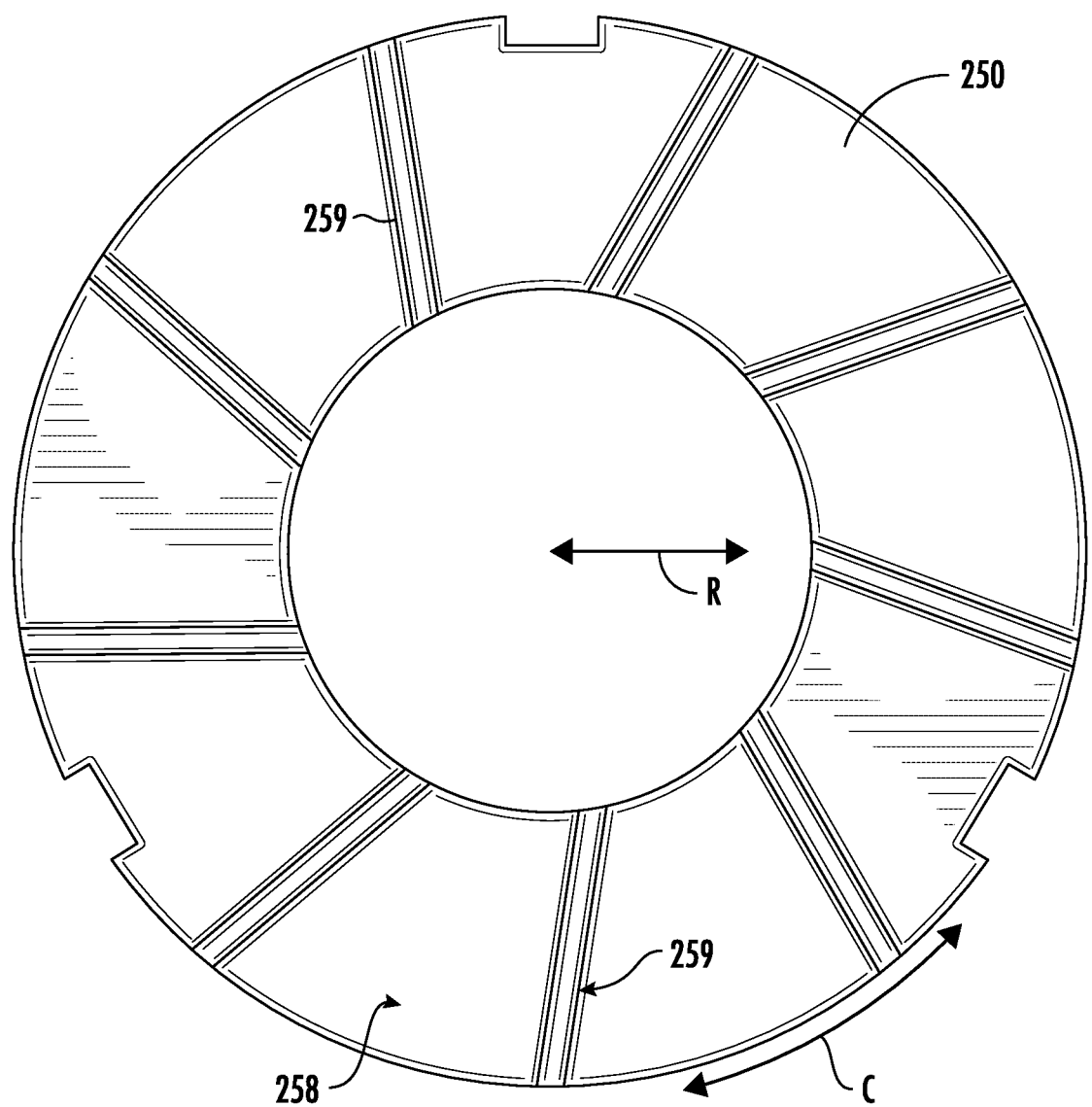
FIG. 8 is a rear, elevation view of the bearing cap of FIG. 7.
Figure 9:
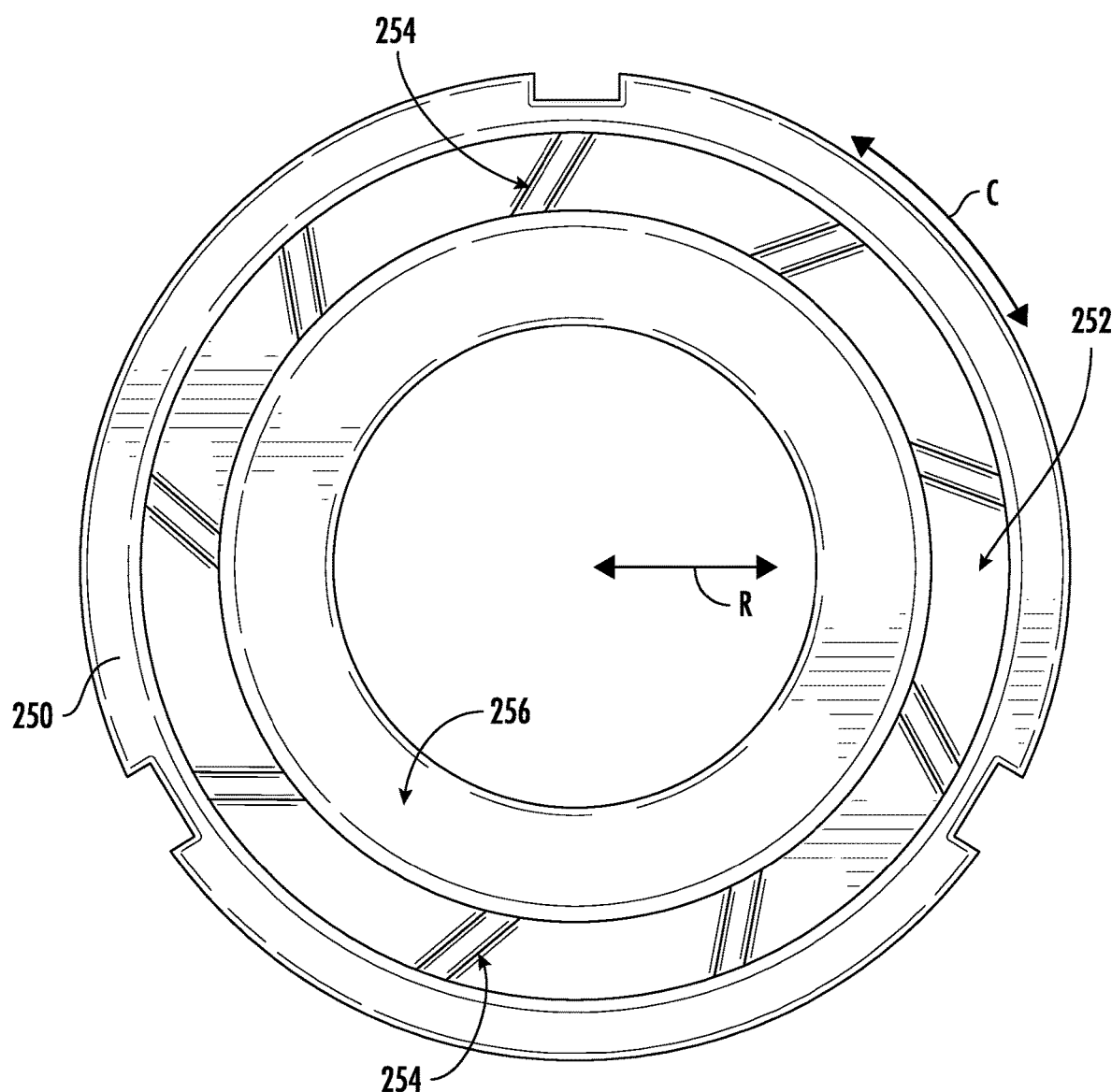
FIG. 9 is a front, elevation view of the bearing cap of FIG. 7.

FIG. 7 is a front, perspective view of bearing cap 250 of stator 200. FIG. 8 is a rear, elevation view of bearing cap 250. FIG. 9 is a front, elevation view of bearing cap 250. As shown in FIGS. 2-4, bearing cap 250 may be mounted to annular bearing support 210 at center opening 212 of annular bearing support 210. Turning back to FIGS. 7-9, bearing cap 250 may have a first side 256 and a second side 258. First and second sides 256, 258 of bearing cap 250 may be positioned opposite each other on bearing cap 250, e.g., along the axial direction A.

Bearing cap 250 may form a first thrust bearing surface 252, e.g., at first side 256 of bearing cap 250. Thus, bearing cap 250 may form an integral thrust bearing on a surface of bearing cap 250. First thrust bearing surface 252 of bearing cap 250 may contact and slide against another component of torque converter 100, such as a plate 154 of torsion damper 150, as shown in FIG. 2. Thus, force may be transferred between plate 154 and stator 200 via the interface formed with first thrust bearing surface 252.

With reference to FIGS. 4-6, web 230 may form a second thrust bearing surface 232. Thus, web 230 may form an integral thrust bearing on a surface of web 230. Second thrust bearing surface 232 of web 230 may contact and slide against another component of torque converter 100, such as housing 102 of torque converter 100, as shown in FIG. 2. Thus, force may be transferred between housing 102 and stator 200 via the interface formed with second thrust bearing surface 232. Second thrust bearing surface 232 may face opposite first thrust bearing surface 252, e.g., along the axial direction A.

Each of first and second thrust bearing surfaces 252, 232 may include a respective plurality of channels 254, 234. Channels 254 may extend across first thrust bearing surface 252, e.g., along the radial direction R. Similarly, flow channels 234 may extend across second thrust bearing surface 232, e.g., along the radial direction R. Fluid F may flow through channels 254, e.g., to assist with cooling the thrust bearings, reducing friction, etc.

Bearing cap 250 may also include a plurality of channels 259 at second side 258 of bearing cap 250. Channels 259 may extend across second side 258 of bearing cap 250, e.g., along the radial direction R. Fluid F may flow through channels 259, e.g., to assist with cooling the bearings 258, reducing friction, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A torque convertor stator, comprising:
   an annular bearing support;
   a plurality of stator blades; and
   a web extending radially between the annular bearing support and the plurality of stator blades,
   wherein the annular bearing support, the plurality of stator blades, and the web are formed from a single continuous piece of amorphous metal, and
   wherein an axial thickness of the web is no greater than about three millimeters and no less than a half of a millimeter.

2. The torque convertor stator of claim 1, further comprising a one-way clutch positioned at a center opening of the annular bearing support, wherein the annular bearing support forms an outer race of the one-way clutch.

3. The torque convertor stator of claim 2, wherein the outer race comprises a plurality of bearing slots and a plurality of flanges, each slot of the plurality of bearing slots positioned circumferentially between a respective pair of flanges of the plurality of flanges.

4. The torque convertor stator of claim 2, further comprising a bearing cap mounted to the annular bearing support at the center opening of the annular bearing support.

5. The torque convertor stator of claim 4, wherein the bearing cap forms a first thrust bearing surface.

6. The torque convertor stator of claim 5, wherein the web forms a second thrust bearing surface facing opposite the first thrust bearing surface of the bearing cap.

7. The torque convertor stator of claim 6, wherein each of the first and second thrust bearing surfaces defines a respective plurality of radial flow channels.

8. The torque convertor stator of claim 4, wherein the one-way clutch comprises an inner bearing ring and a plurality of bearings, the inner bearing ring forming an inner race of the one-way clutch, the plurality of bearings positioned radially between and riding on the inner and outer races.

9. The torque convertor stator of claim 1, wherein the axial thickness of the web is no greater than about two millimeters.

10. A torque converter, comprising the torque convertor stator of claim 1.

11. A torque convertor stator, comprising:
    an annular bearing support;
    a plurality of stator blades;
    a web extending radially between the annular bearing support and the plurality of stator blades; and
    a one-way clutch positioned at a center opening of the annular bearing support,
    wherein the annular bearing support, the plurality of stator blades, and the web are formed from a single continuous piece of amorphous metal,
    wherein the annular bearing support forms an outer race of the one-way clutch at an inner surface of the annular bearing support, and
    wherein an axial thickness of the web is no greater than about three millimeters and no less than a half of a millimeter.

12. The torque convertor stator of claim 11, wherein the outer race comprises a plurality of bearing slots and a plurality of flanges, each slot of the plurality of bearing slots positioned circumferentially between a respective pair of flanges of the plurality of flanges.

13. The torque convertor stator of claim 11, further comprising a bearing cap mounted to the annular bearing support at the center opening of the annular bearing support.

14. The torque convertor stator of claim 13, wherein the bearing cap forms a first thrust bearing surface.

15. The torque convertor stator of claim 14, wherein the web forms a second thrust bearing surface facing opposite the first thrust bearing surface of the bearing cap along an axis of the torque convertor stator.

16. The torque convertor stator of claim 15, wherein each of the first and second thrust bearing surfaces defines a respective plurality of radial flow channels.

17. The torque convertor stator of claim 13, wherein the one-way clutch comprises an inner bearing ring and a plurality of bearings, the inner bearing ring forming an inner race of the one-way clutch, the plurality of bearings positioned radially between and riding on the inner and outer races.

18. The torque convertor stator of claim 11, wherein the axial thickness of the web is no greater than about two millimeters.

19. A torque converter, comprising the torque convertor stator of claim 11.

* * * * *